United States Patent [19]

Nakashima

[11] Patent Number: 5,731,975

[45] Date of Patent: Mar. 24, 1998

[54] TEMPERATURE ASSUMING APPARATUS FOR A BRAKE PAD AND WHEEL SLIP CONTROLLING APPARATUS USING THE SAME

[75] Inventor: Seiichi Nakashima, Susono, Japan

[73] Assignee: Toyota Jidosha Kabushiki Kaisha, Aichi-ken, Japan

[21] Appl. No.: 502,291

[22] Filed: Jul. 13, 1995

[30] Foreign Application Priority Data

Aug. 5, 1994 [JP] Japan .................................. 6-184876

[51] Int. Cl.$^6$ .............................. B60T 8/00; B60T 17/22
[52] U.S. Cl. ................................. 364/426.028; 180/197; 303/191; 303/139
[58] Field of Search ................ 364/426.027, 426.028, 364/426.032, 426.01; 180/197; 303/191, 139, 145

[56] References Cited

U.S. PATENT DOCUMENTS

| | | | |
|---|---|---|---|
| 4,484,280 | 11/1984 | Brugger et al. | 364/426 |
| 4,591,213 | 5/1986 | Rapport | 303/93 |
| 4,970,650 | 11/1990 | Hashiguchi et al. | 364/426.02 |
| 5,136,508 | 8/1992 | Bannon et al. | 364/426.01 |
| 5,283,742 | 2/1994 | Wazaki et al. | 364/426.02 |
| 5,287,279 | 2/1994 | Anan | 364/426.02 |
| 5,455,771 | 10/1995 | Fujioka | 364/426.03 |
| 5,524,974 | 6/1996 | Fischle et al. | 303/191 |
| 5,613,744 | 3/1997 | Eslinger et al. | 303/191 |

FOREIGN PATENT DOCUMENTS

| | | |
|---|---|---|
| A-1-4020693 | 2/1992 | Germany . |
| A-1-4235364 | 4/1994 | Germany . |
| A-1-103563 | 4/1989 | Japan . |
| A-1-249557 | 10/1989 | Japan . |
| A-2-95961 | 4/1990 | Japan . |

*Primary Examiner*—Michael Zanelli
*Attorney, Agent, or Firm*—Oliff & Berridge

[57] ABSTRACT

A wheel slip controlling apparatus uses a temperature assuming apparatus to assume a temperature of a brake pad by calculating an increase in temperature of the brake pad due to regular braking operations and braking operations performed for controlling an acceleration slip of a driving wheel. An increase in temperature of a brake pad due to normal braking operations is calculated. This increase in temperature responds to braking deceleration. An increase in temperature of the brake pad due to a braking operation for controlling the acceleration slip of the driving wheel is calculated. This increase in temperature responds to a braking force and a rotational speed of the driving speed. A decrease in temperature of the brake pad when a braking operation is not performed is calculated. This decrease in temperature responds to a rotational speed of the driving wheel. A temperature of the brake pad is assumed in accordance with determinations of vehicle operations. A braking operation is controlled to reduce an acceleration slip of a driving wheel during acceleration in accordance with the assumed temperature of the brake pad.

12 Claims, 11 Drawing Sheets

TEMPERATURE ASSUMING APPARATUS FOR A BRAKE PAD AND WHEEL SLIP CONTROLLING APPARATUS USING THE SAME

BACKGROUND OF THE INVENTION

(1) Field of the Invention

The present invention relates to a temperature assuming apparatus for assuming a temperature of a brake pad provided in a wheel of a vehicle and, more particularly, to a temperature assuming apparatus used for controlling slippage which may be generated in a driving wheel during acceleration, and to a wheel slip controlling apparatus using such a temperature assuming apparatus.

(2) Description of the Related Art

Conventionally, a slip controlling apparatus is known to control slippage of a driving wheel which may occur due to acceleration. Such a slippage is referred to as an acceleration slip. Such a slip controlling apparatus controls the acceleration slip by controlling an output of the engine of the vehicle and by performing a braking operation.

Japanese Laid-Open Patent Application No. 1-249557 discloses a conventional slip controlling apparatus which varies the frequency of braking operations based on a determination of whether the condition of the brake system is close to a brake fading state. The determination is made based on frequency of braking operations or a total duration of braking operations since the acceleration slip of a driving wheel was generated. Braking performance is reduced when a condition of the brake system is incipient to the brake fading state.

The above-mentioned slip controlling apparatus does not consider a temperature increase due to regular braking operations other than the braking operations performed for controlling the acceleration slip of a driving wheel. Therefore, braking performance is varied due to variations in the temperature of a brake pad and, thus, there is a problem in that optimum braking control cannot be achieved.

SUMMARY OF THE INVENTION

It is a general object of the present invention to provide an improved and useful temperature assuming apparatus in which the above-mentioned problem is eliminated.

A more specific object of the present invention is to provide a temperature assuming apparatus in which the temperature of a brake pad is assumed by calculating an increase in temperature of the brake pad due to regular braking operations and braking operations performed for controlling an acceleration slip of a driving wheel.

Another object of the present invention is to provide a wheel slip controlling apparatus using a temperature assuming apparatus in which the temperature of a brake pad is assumed by calculating an increase in temperature of the brake pad due to regular braking operations and braking operations performed for controlling an acceleration slip of a driving wheel.

FIG. 1 is a block diagram for explaining a principle of a wheel slip controlling apparatus according to the present invention.

As shown in FIG. 1, the wheel slip controlling apparatus comprises a brake controlling means M1, a first temperature increase calculating means M2, a second temperature increase calculating means M3, a temperature decrease calculating means M4 and a temperature assuming means M5. The brake controlling means M1 controls a braking operation so as to reduce an acceleration slip of a driving wheel during acceleration. The first temperature increase calculating means M2 calculates an increase in temperature of a, brake pad due to normal braking operations, the increase in temperature being in response to braking deceleration. The second temperature increase calculating means M3 calculates an increase in temperature of the brake pad due to a braking operation for controlling the acceleration slip of the driving wheel, the increase in temperature being in response to a braking force and a rotational speed of the driving speed. Hereinafter, the braking operation for controlling the acceleration slip of a driving wheel is referred to as a brake controlling operation. The temperature decrease calculating means M4 calculates a decrease in temperature of the brake pad when a braking operation is not performed, the decrease in temperature being in response to a rotational speed of the driving wheel. The temperature assuming means assumes a temperature of the brake pad in accordance with the calculation performed by the first and second temperature increase calculating means M2 and M3 and temperature decrease calculating means M4. The first temperature increase calculating means M2, the second temperature increase calculating means M3, the temperature decrease calculating means M4 and the temperature assuming means M5 together constitute a temperature assuming apparatus.

The above-mentioned wheel slip controlling apparatus may further comprise an engine controlling means M6 and a distributing means M7. The engine controlling means M6 controls the acceleration slip of the driving wheel by controlling an output of the engine of the vehicle. The distributing means M7 distributes load for controlling the acceleration slip of the driving wheel to the brake controlling means M1 and the engine controlling means M7.

Other objects, features and advantages of the present invention will become more apparent from the following detailed description when read in conjunction with the accompanying drawings.

DETAILED DESCRIPTION OF THE PREFERRED EMBODIMENTS

Figure 1:
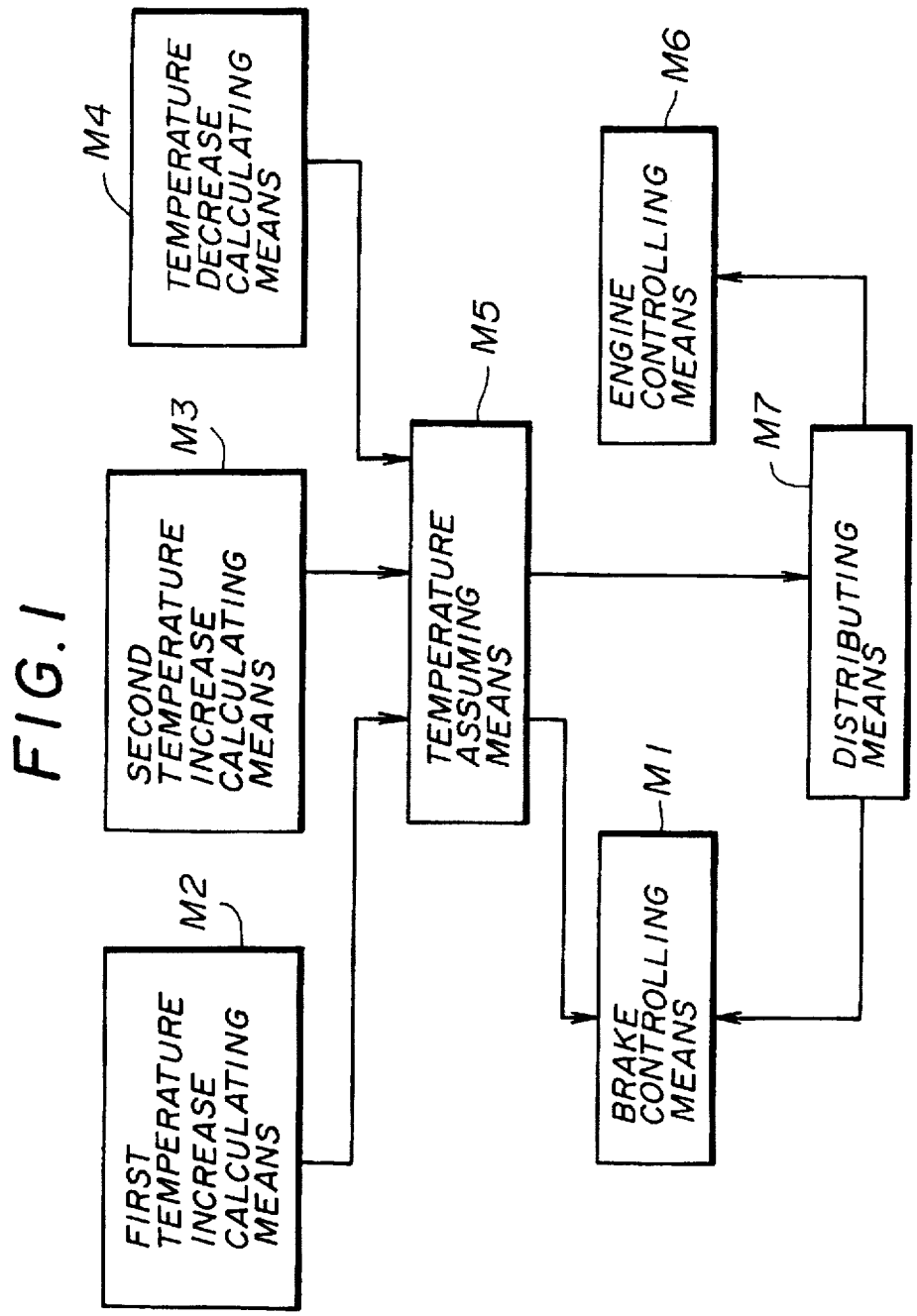
FIG. 1 is a block diagram for explaining a principle of a wheel slip controlling apparatus according to the present invention.
Figure 2:
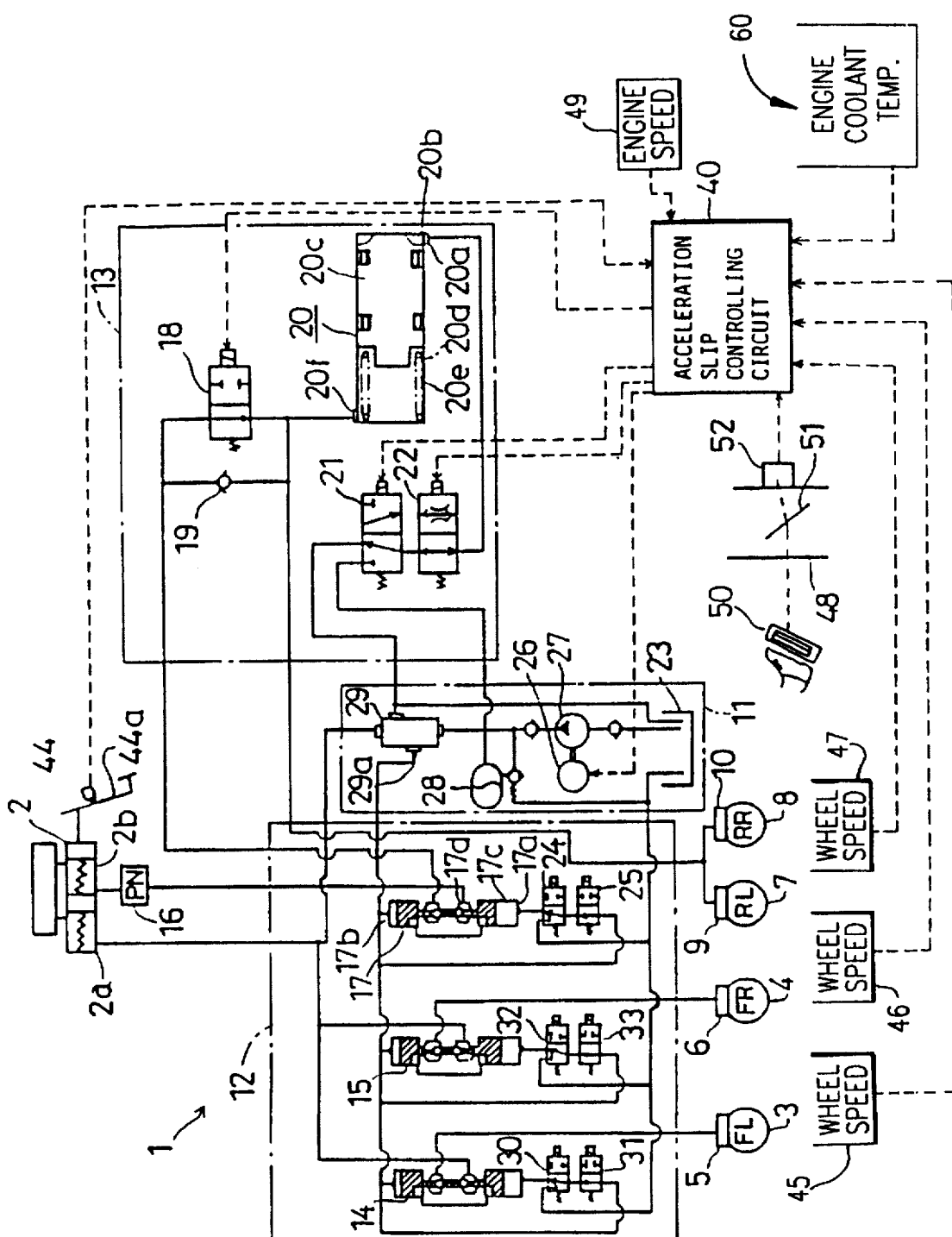
FIG. 2 is an illustration showing a part of a structure of an automobile to which an embodiment of the wheel slip controlling apparatus according to the present invention is applied.

A description will now be given, with reference to FIG. 2, an embodiment of a wheel slip controlling apparatus according to the present invention. FIG. 2 is an illustration showing part of a structure of an automobile to which an embodiment of the wheel slip controlling apparatus according to the present invention is applied.

As shown in FIG. 2, the automobile comprises a master cylinder 2 of a brake system, wheel cylinders 5 and 6 of left and right front wheels 3 and 4, wheel cylinders 9 and 10 of left and right rear wheels 7 and 8, a hydraulic power source 11, anti-skid controlling hydraulic circuits 12, and an acceleration slip controlling hydraulic circuit 13. In this embodiment, the front wheels 3 and 4 are idler or driven wheels, and the rear wheels 7 and 8 are driving wheels.

Volume controlling valves 14 and 15 are provided to brake hydraulic lines between a first hydraulic chamber 2a of the master cylinder 2 and the front wheels 3 and 4. The volume controlling valves 14 and 15 are used for controlling an anti-skid operation for the left and right front wheels 3 and 4. A proportioning valve 16, a volume controlling valve 17, a first solenoid valve 18, a check valve 19 and a volume controlling valve 20 are provided to hydraulic circuits between a second hydraulic chamber 2b of the master cylinder 2 and the wheel cylinders 9 and 10. The volume controlling valve 17 is used for controlling an anti-skid operation for the left and right rear wheels 7 and 8. The first solenoid valve 18 and the check valve 19 are connected in parallel. The volume controlling valve 20 is used for controlling acceleration slip of the rear wheel 7 and 8.

When an anti-skid operation is performed, the solenoid valve 18 as shown in FIG. 2 is not activated. Thereby, the volume controlling valve 17 for controlling an anti-skid operation and the volume controlling valve 20 for controlling an acceleration slip communicate with each other. Additionally, a hydraulic pressure controlling chamber 20b of the volume controlling valve 20 communicates with a reservoir 23 of the hydraulic power source 11 since a second solenoid valve 21 and a third solenoid valve 22 as shown in. FIG. 2 are not activated. The second solenoid valve 21 and the third solenoid valve 22 are connected in series, and the third solenoid valve 22 is connected to a control input port 20a of the volume controlling valve 20. Accordingly, a piston 20c of the volume controlling valve 20 is maintained at a position shown in FIG. 2 by the pressing force provided by a spring 20d.

In the above-mentioned state, the volume controlling valve 17 is positioned in one of three states by switching the first switching valve 24 and a second switching valve 25 both provided for the rear wheels 7 and 8. The first switching valve 24 communicates with a first control input port 17a, and the second switching valve 25 communicates with the first switching valve 24. The three states are described below.

State A1): The first control input port 17a communicates with an output port 29a of a regulator 29. The regulator 29 converts a hydraulic pressure supplied by an accumulator 28 to a hydraulic pressure responding to a braking operation. The hydraulic pressure accumulated in the accumulator is supplied by a pump 27 driven by a motor 26 of the hydraulic power source 11.

State A2): The communications between the first control input port 17a and each of the regulator 29 and the reservoir 23 are interrupted.

State A3): The first control input port 17a is communicated with only the reservoir 23.

A second control input port 17b is always in communication with the output port 29a of the regulator 29. Accordingly, the volume controlling valve 17 operates in with the above-mentioned three states as described below.

Pressure in the first hydraulic chamber 17c having the first control input port 17a is increased (State A1), maintained (State A2) or decreased (State A3). The volume of a brake hydraulic chamber 17d is varied by the pressure in the first hydraulic chamber 17c. Accordingly, the volume controlling valve 17 increases (State A1), maintains (State A2) or decreases (State A3) a pressure in each of the wheel cylinders 9 and 10 of the rear wheels.

Similarly to the switching valves 24 and 25, switching valves 30 and 31 and the volume controlling valve 14 are provided for the wheel cylinder 5, and switching valves 32 and 33 and the volume controlling valve 15 are provided for the wheel cylinder 6. It should be noted that activation and deactivation of the switching valves 24, 25, 30, 31, 32 and 33 are controlled by an anti-skid controlling device not shown in the figure.

When the acceleration slip control is performed, the solenoid valve 18 is activated So that the communication between the volume controlling valve 17 and the volume controlling valve 20 is interrupted. In this state, the volume controlling valve 20 is set to one of four states by a combination of activation and deactivation of the solenoid valves 21 and 22. The four states are described below.

State B1): The control input port 20a is directly communicated with the accumulator 28.

State B2): The control input port 20a is communicated with the accumulator 28 via an orifice.

State B3): The control input port 20a is communicated with the reservoir 23 via the orifice.

State B4): The control input port is directly communicated with the reservoir 23.

Accordingly, the volume controlling valve 20 is operated in the above-mentioned four states as described below.

Pressure in the controlling hydraulic chamber 20b provided with the control input port 20a is increased (State B1), gradually increased (State B2), gradually decreased (State B3) or decreased (State B4). The volume of the controlling hydraulic chamber 20b is varied by the pressure in the controlling hydraulic chamber 20b. Accordingly, the piston 20c is displaced in directions from left to right or from right to left in the figure. Thereby, a pressure is applied to the wheel cylinders 9 and 10 from an output port 20f of a brake hydraulic chamber 20e. Thus, the pressure in each of the wheel cylinders 9 and 10 of the rear wheels is increased (State B1), gradually increased (State B2), gradually decreased (State B3) or decreased (State B4). The above-mentioned braking operation for the rear wheels 7 and 8 is performed by controlling the first to third solenoid valves 18, 21 and 22 and the motor 26 when acceleration slip is generated. The first to third solenoid valves 18, 21 and 22 and the motor 26 are controlled by an acceleration slip controlling circuit 40.

More specifically, a pedal switch 44, rotational speed sensors 45, 46 and 47, an engine speed sensor 49, a throttle position sensor 52 and a coolant temperature sensor 60 are connected to the acceleration slip controlling circuit 40. The pedal switch 44 outputs an on/off signal in accordance with operation of a brake pedal 44a. The rotational speed sensor 45 senses rotational speed of the front left wheel 3. The rotational speed sensor 46 senses a rotational speed of the front right wheel 4. The rotational speed sensor 47 senses a rotational speed of the rear left and right wheels 7 and 8. The engine speed sensor 49 senses rotational speed of the engine crankshaft driving the rear wheels 7 and 8. The throttle position sensor 52 detects an angle of a main throttle valve 51 which opens or closes an intake line of the engine. The main throttle valve 51 is connected to an acceleration pedal 50 which is operated by a driver. The coolant temperature sensor 60 senses the engine coolant temperature. The acceleration slip controlling circuit 40 determines acceleration slip generated in the rear wheels in accordance with signals input from the above-mentioned sensors so as to perform a braking operation for controlling the slippage of the rear wheels. It should be noted that the rotational speed sensor 47 for sensing the rotational speed of the rear wheels 7 and 8 is provided to an output shaft of a transmission which transmits rotational force of the engine to the rear wheels 7 and 8. The rotational speed sensor 47 senses an average of the rotational speeds of the rear left and right wheels 7 and 8 which are driven via a differential gear.

Figure 3:
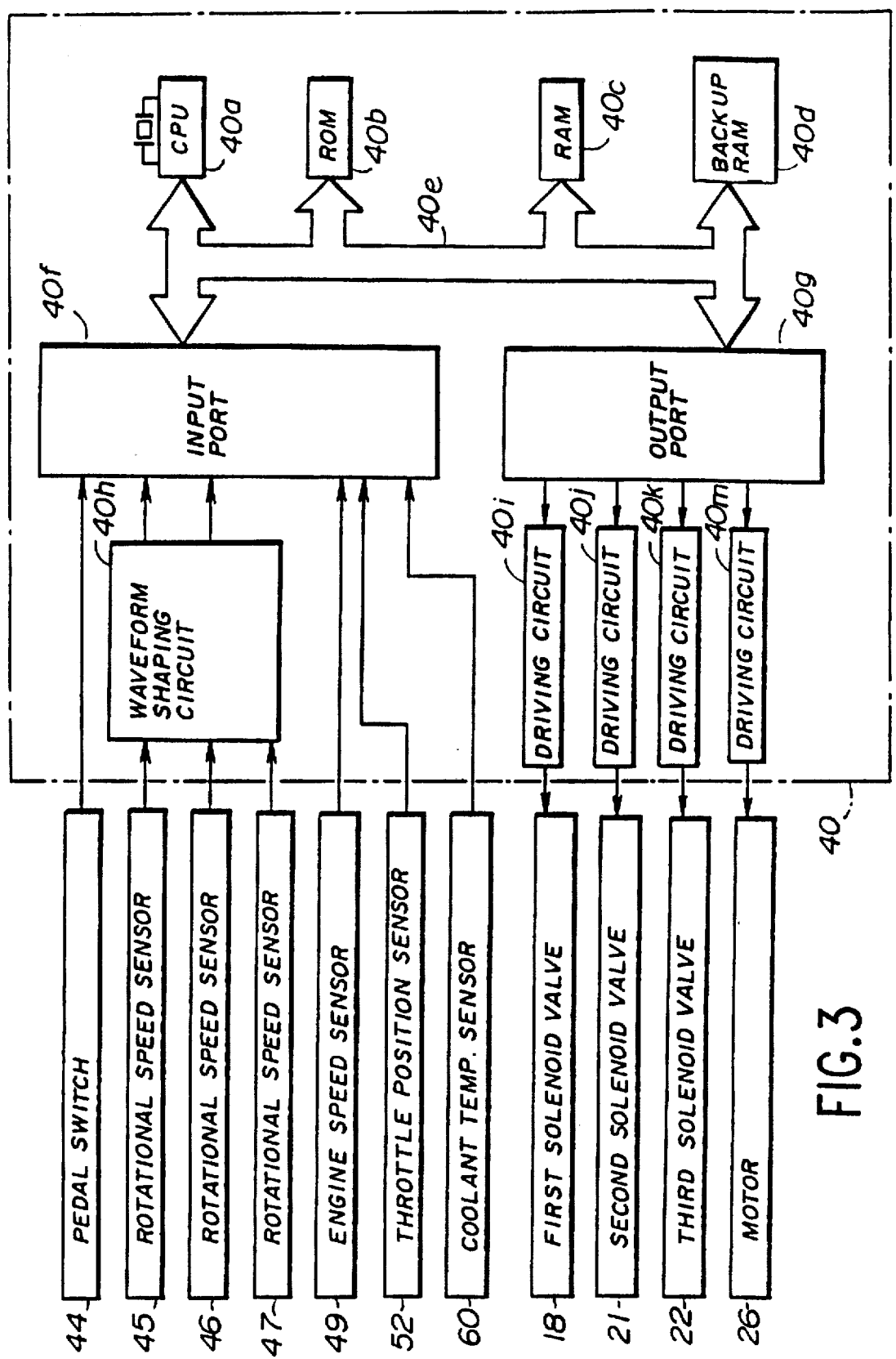
FIG. 3 is a block diagram of an acceleration slip controlling circuit provided in the wheel slip controlling apparatus shown in FIG. 2.

The acceleration slip controlling circuit 40 comprises, as shown in FIG. 3, a CPU 40a, a ROM 40b, a RAM 40c and a backup RAM 40d, a common bus 40e, an input port 40f and an output port 40g. The input port 40f and the output port 40g are connected to the CPU 40a, the ROM 40b, the RAM 40c and the RAM 40d via the common bus 40e so as to perform an input/output operation.

Signals from the pedal switch 44, the engine speed sensor 49, the throttle position sensor 52 and the coolant temperature sensor 60 are directly input to the input port 40f. Signals from the rotational speed sensors 45, 46 and 47 are input to the input port 40f via a waveform shaping circuit 40h. The signals input to the input port 40f are input to the CPU 40a via the common bus 40e.

The acceleration slip controlling circuit further comprises driving circuits 40i, 40j, 40k and 40m for driving the first to third solenoid valves 18, 21 and 22 and the motor 26 for driving the pump 27, respectively. The CPU 40a outputs control signals to each of the driving circuits 40i, 40j, 40k and 40m.

Figure 4:
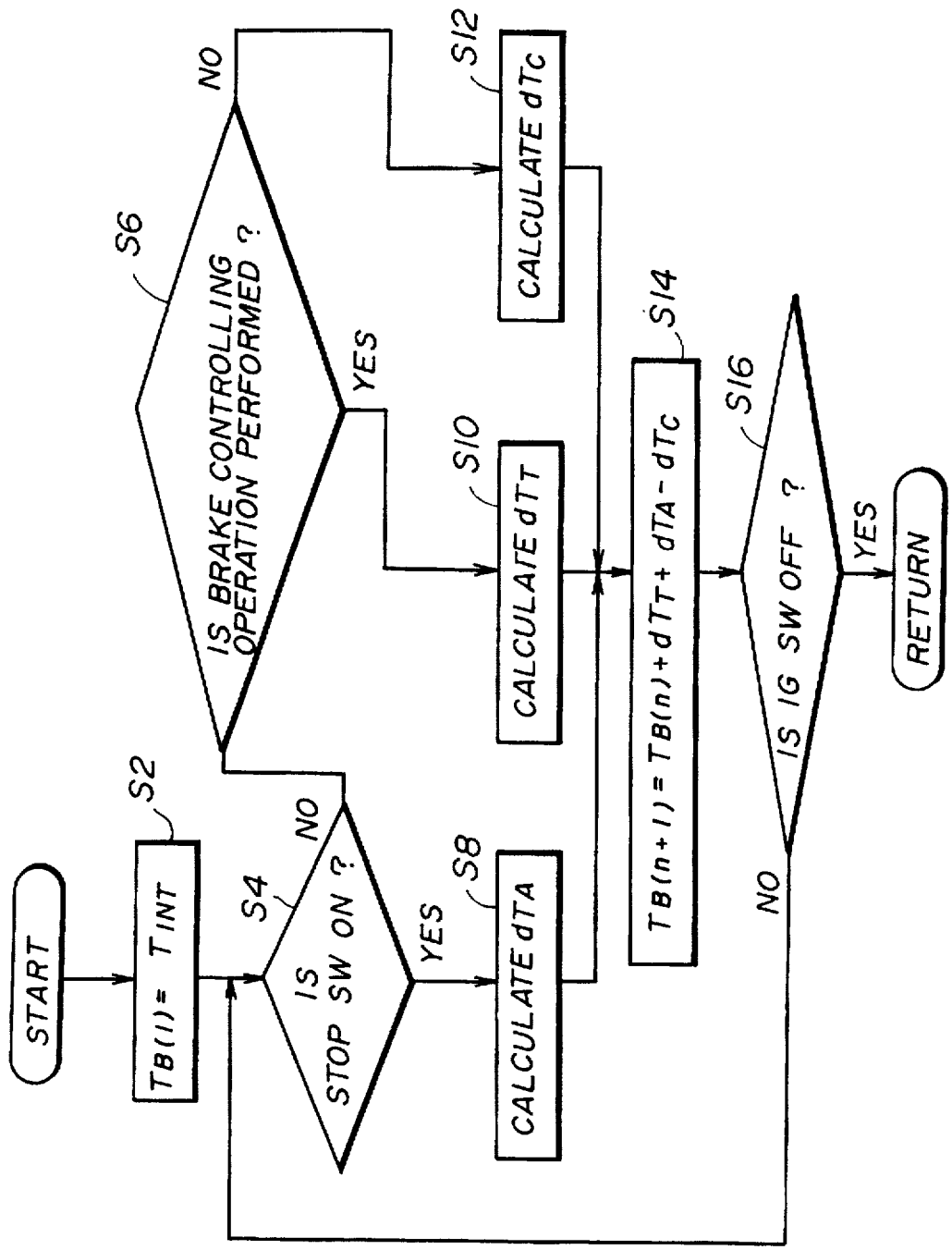
FIG. 4 is a flowchart of a process for assuming a temperature of a brake pad.

FIG. 4 is a flowchart of a process for assuming a temperature of a brake pad. In step 2 (hereinafter step is abbreviated as S), a temperature $T_{B(1)}$ of the brake pad is set to an initial temperature $T_{INT}$. An ambient temperature or zero degree is used as the initial temperature $T_{INT}$. It is determined, in S4, whether or not the pedal switch 44 is turned on. If it is determined that the pedal switch 44 is not turned on, the routine proceeds to S6. It is then determined, in S6, whether or not a brake controlling operation for controlling the slippage of the driving wheels is performed. The determination is made based on whether a brake control execution flag is set or reset.

If it is determined, in S4, that the pedal switch 44 is turned on, the routine proceeds to S8 in which a temperature increase $dT_A$ of the brake pad of each of the rear left and right wheels (driving wheels) 7 and 8 due to a normal braking operation is calculated by the following equation.

$$dT_A = \beta \cdot \gamma \cdot W_0 \cdot (V_A^2 - V_B^2)/4 \cdot g \cdot J \cdot W_0 \cdot c \quad (1)$$

Where, $\beta$ is a coefficient of heat loss;
$W_b$ is the weight of sliding part of the rotor (kg);
J is the heat equivalent of work (426.96 kg/kcal);
C is the specific heat of rotor (kcal);
$W_0$ is the weight of the automobile (kg);
y is a distribution ratio of braking force;
$V_A$ is a speed when a braking operation is started; (m/sec.);
$V_B$ is a speed when a braking operation is ended (m/sec.).

If it is determined, in S6, that the brake controlling operation is being performed, the routine proceeds to S10 in which a temperature increase $dT_T$ of the brake pad of each of the rear left and right wheels (driving wheels) 7 and 8 due to the brake controlling operation is calculated by the following equation.

$$dT_T = aU + b \quad (2)$$

$$U_T = \int (k \cdot P_B \cdot V_{WR}) dt \quad (3)$$

Where, a, b and k are constants;
$U_T$ is energy absorbed by a brake pad;
$P_B$ is the pressure applied to a wheel cylinder;
$V_{WR}$ is the rotational speed of a driving wheel.

Figure 5:
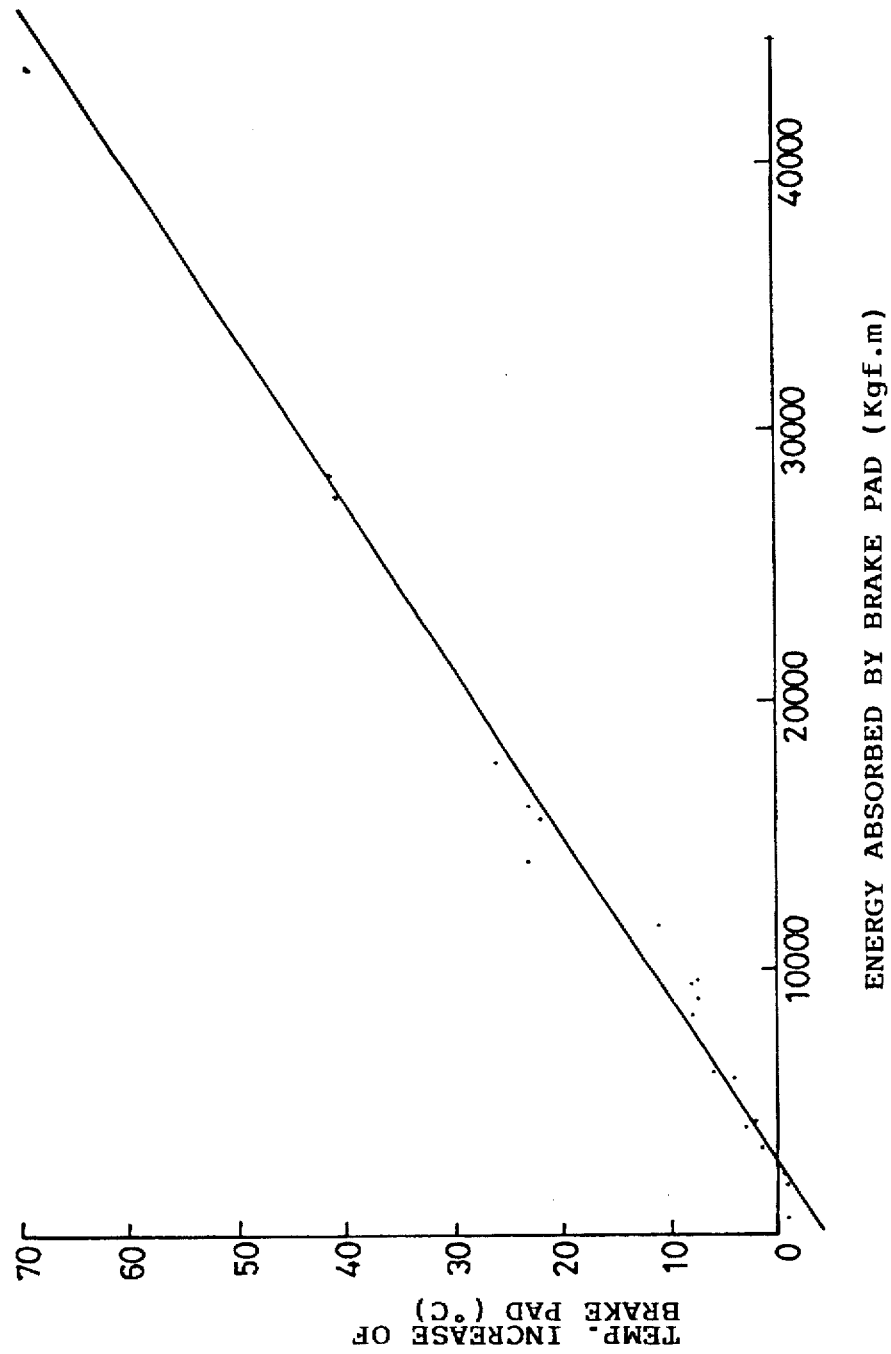
FIG. 5 is a graph showing a relationship between energy absorbed by a brake pad and a temperature increase of the brake pad.

FIG. 5 is a graph showing a relationship between energy $U_T$ absorbed by the brake pad and the temperature increase $T_T$, the relationship being represented by the equation (2).

If it is determined, in S6, that the braking operation is not being performed, the routine proceeds to S12 in which temperature decrease $dT_C$ of the brake pad of each of the rear left and right wheels (driving wheels) 7 and 8 is calculated by the following equation.

$$dT_C = k1(T_{B(n)} - T_{INT}) \quad (4)$$

Where, k1 is a cooling factor corresponding to a speed of the automobile.

After the above-mentioned steps S8, S10 or S12 is processed, the routine proceeds to S14 in which a temperature $T_B$ of the brake pad of each of the driving wheels 7 and 8 is calculated by the following equation.

$$T_{B(n+1)} = T_{B(n)} + dT_T + dT_A - dT_C \quad (5)$$

Thereafter, it is determined, in S16, whether or not an ignition switch is turned on. If the ignition switch is turned on, the routine returns to S4 to repeat the above-mentioned steps. If the ignition switch is off, the routine is ended.

As mentioned above, in the present embodiment, since the temperature of the brake pad is assumed by using the temperature increases due to the normal braking operation and the brake controlling operation, and also using temperature decrease when a braking operation is not performed, the assumed temperature of the brake pad is accurate.

Figure 6:
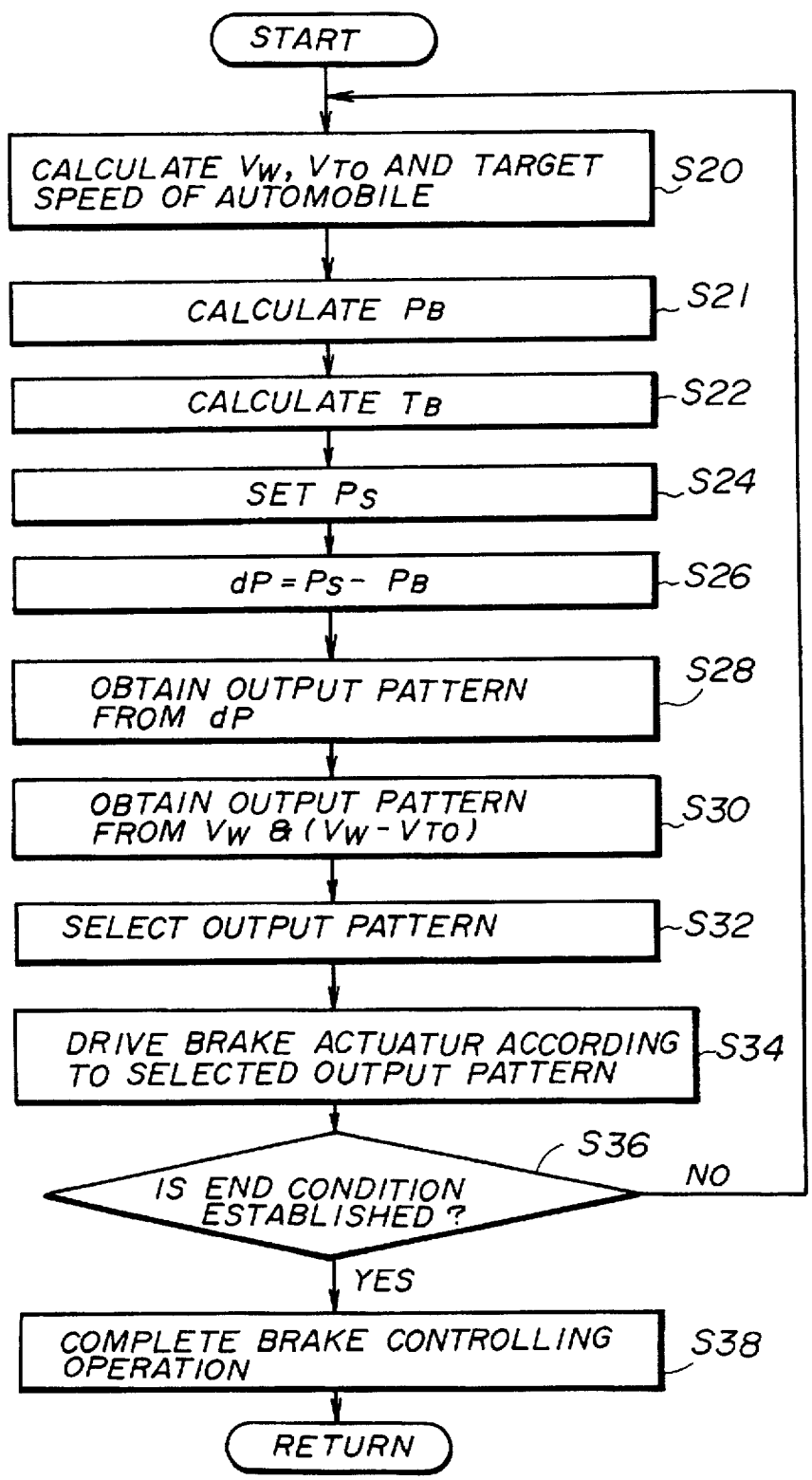
FIG. 6 is a flowchart of an operation of an automobile which performs a brake controlling operation for controlling an acceleration slip without cutting fuel for control of the engine.

FIG. 6 is a flowchart of a process executed by an automobile which performs the brake controlling operation for controlling acceleration slip without a fuel cut-off control of an engine. This process is executed, for example, every 8 msec after starting conditions for the brake controlling operation has been established, by setting a brake controlling operation executing flag. The starting conditions include a condition such as: the automobile is allowed to perform the brake controlling operation; the rotational speed of a driving wheel is more than a predetermined target speed; a speed of the automobile is less than a predetermined speed, for example, 270 km/h; the acceleration slip controlling circuit 40 has no malfunction.

In S20, a rotational speed $V_W$ of the driving wheel, the speed $V_{TO}$ of the automobile and the target speed of the driving wheel are calculated, respectively, by using outputs of the rotational speed sensors 45, 46 and 47. In S21, a pressure $P_B$ in each of the wheel cylinders 9 and 10 is calculated based on durations of pressure increase/decrease. In S22, the temperature $T_B$ of the brake pad of each of the driving wheels 7 and 8 is assumed by performing the process shown in FIG. 4.

Figure 7:
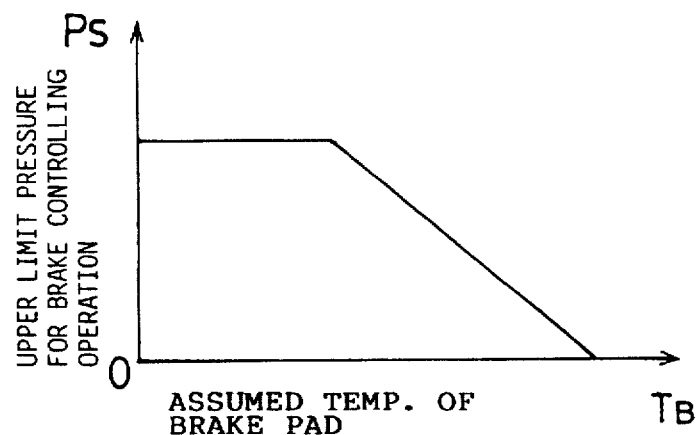
FIG. 7 is a graph representing a relationship between an upper limit pressure and an assumed temperature of a brake pad.

Thereafter, in S24, an upper limit pressure $P_S$ for the brake controlling operation is obtained by using a greater one of temperatures $T_B$ of the rear left and right wheels 7 and 8 and by referring to a graph shown in FIG. 7. The map shown in FIG. 7 represents a relationship between the upper limit pressure $P_S$ and the assumed temperature of the brake pad. It should be noted that the upper limit pressure $P_S$ starts to decrease in reverse proportion to an increase in the assumed temperature from a certain point. After the upper limit pressure $P_S$ is obtained, a greater pressure difference dP of pressure differences between the upper limit pressure $P_S$ and each of the pressure $P_B$ in the wheel cylinders 9 and 10 is obtained in S26.

Figure 8:
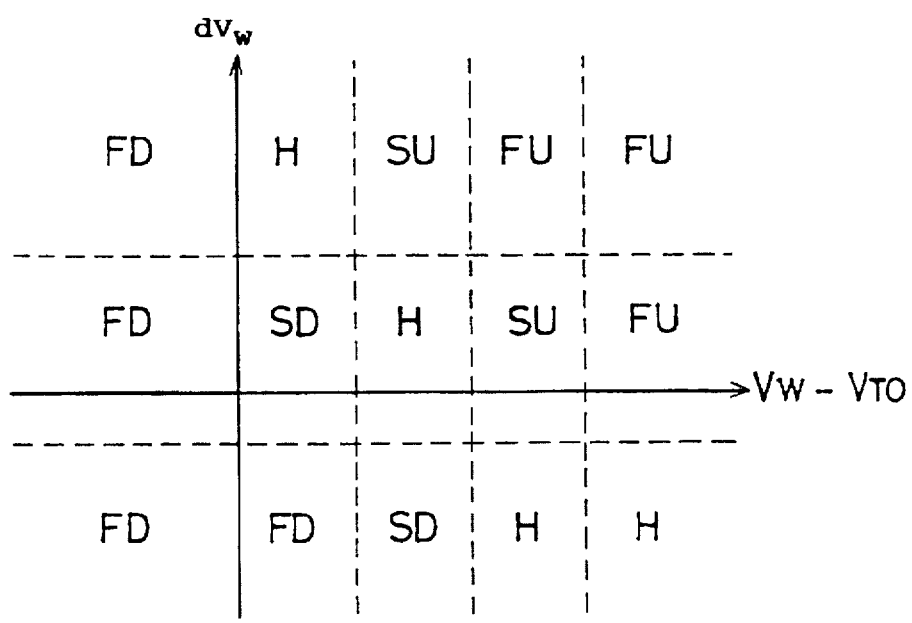
FIG. 8 is a map of output patterns of an operating pressure used for brake controlling.

In S28, a first output pattern of a pressure to be applied to the wheel cylinders to control the acceleration slip is set by comparing the pressure difference dP with predetermined values a and b, where a>b and, for example, a=15 kg/cm$^2$ and b=5 kg/cm$^2$. For example, the output pattern for the brake controlling operation is determined as: a sharp increase FU if dP<−a; a gentle increase SU if −a≦dP<−b; a gentle decrease SD if −b≦dP<b; a sharp decrease FD if a≦dP. Thereafter, in S30, a second output pattern for the brake controlling operation is set by referring to a two dimensional map shown in FIG. 8. The second output pattern is obtained by using an acceleration $dV_W$ which is a value of differential calculus of the speed $V_W$ of the driving wheel, and a speed difference ($V_W - V_{TO}$) between the speed $V_W$ of the driving wheel and the assumed speed $V_{TO}$ of the automobile.

In S32, a smaller one of the first output pattern and the second output pattern is selected. In S34, the second and third solenoid valves 21 and 22 are driven in accordance with the output pattern selected in S32. Thereafter, it is determined, in S36, whether or not an ending condition for ending the brake controlling operation is established. The ending condition include conditions such as: the rotational speed of the driving wheel is less than the predetermined target speed; the automobile is not allowed to perform the brake controlling operation; and, a speed of the automobile is greater than a predetermined speed, for example, 300 km/h. If the ending condition has been established, the routine returns to S20 so as to repeat the above-mentioned steps. If the ending condition has not been established, the brake controlling operation executing flag is reset, in S38, to end the brake controlling operation, and then the routine is ended.

As mentioned above, since the assumed temperature of the brake pad is accurate, an appropriate braking force required to perform the brake controlling operation is obtained and, thus, an optimum brake controlling operation can be achieved.

Figure 9:
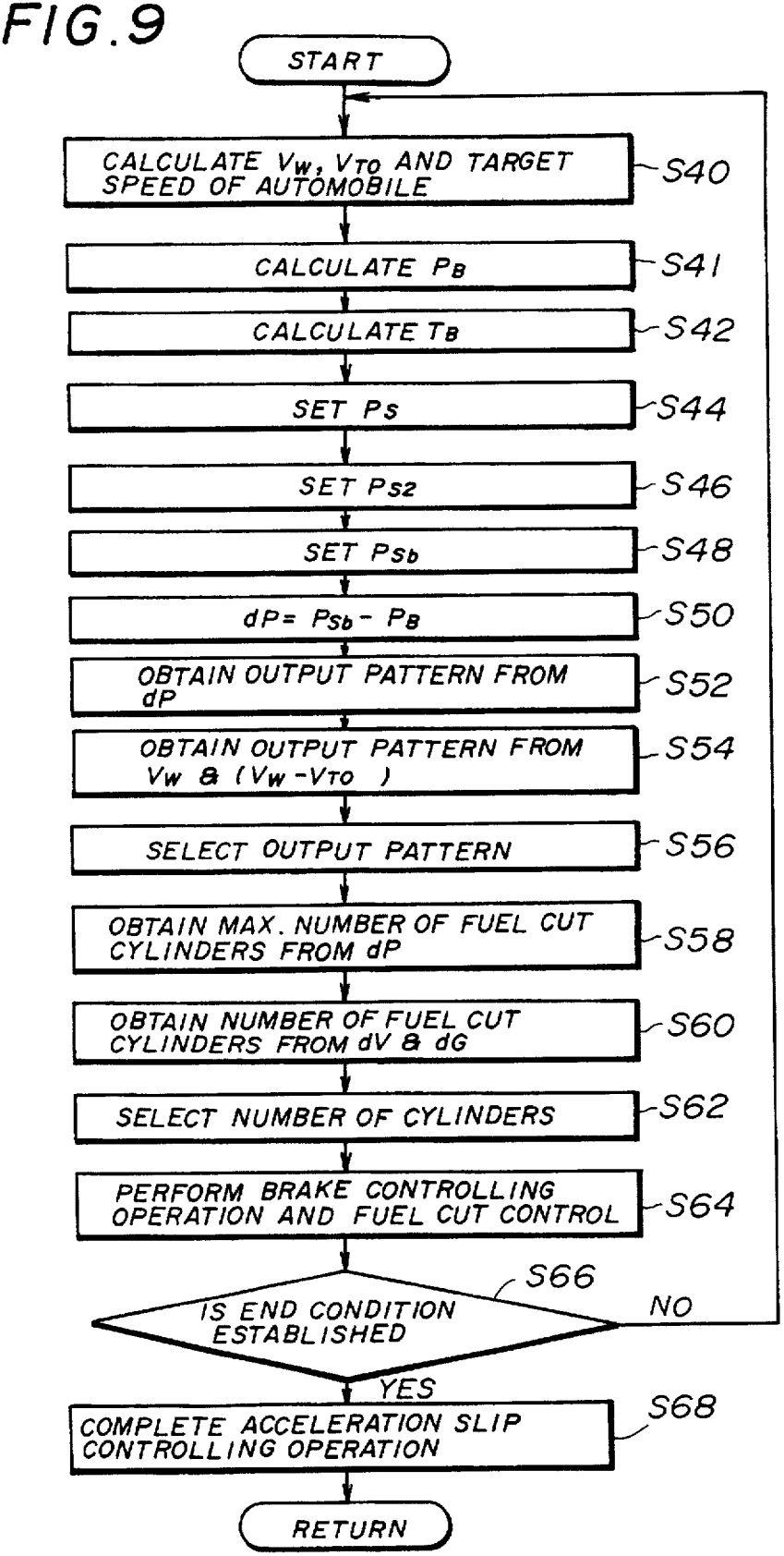
FIG. 9 is a flowchart of an operation of an automobile which performs a brake controlling operation for controlling an acceleration slip with a fuel cutting control operation of an engine.

FIG. 9 is a flowchart of a brake controlling operation for controlling acceleration slip with a fuel cut-off control of an engine. This process is executed, for example, every 8 msec after starting conditions for the brake controlling operation has been established, by setting a brake controlling operation executing flag. The starting conditions includes the conditions such as: the automobile is allowed to perform the brake controlling operation; the rotational speed of a driving wheel is greater than a predetermined target speed; a speed of the automobile is less than a predetermined speed, for example, 270 km/h; and, the acceleration slip controlling circuit 40 has no malfunction.

In S40, a rotational speed $V_W$ of the driving wheel, the speed $V_{TO}$ of the automobile and the target speed of the driving wheel are calculated, respectively, by using outputs of the rotational speed sensors 45, 46 and 47. In S41, a pressure $P_B$ in each of the wheel cylinders 9 and 10 is calculated based on durations of pressure increase/decrease. In S42, the temperature $T_B$ of the brake pad of each of the driving wheels 7 and 8 is assumed by performing the process shown in FIG. 4.

Figure 10:
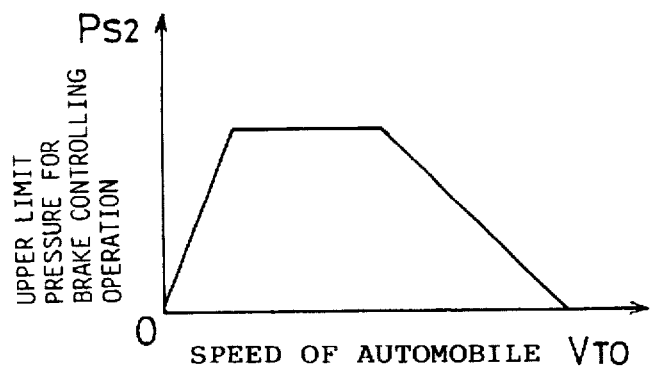
FIG. 10 is a graph representing a relationship between an upper limit pressure for brake controlling operation and speed of an automobile.

Thereafter, in S44, a first upper limit pressure $P_S$ for the brake controlling operation is obtained by 20 using a greater one of temperatures $T_B$ of the rear left and right wheels 7 and 8 and by referring to the graph shown in FIG. 7. A second upper limit pressure $P_{S2}$ for the brake controlling operation is obtained by using the assumed speed $V_{TO}$ of the automobile and by referring to a graph shown in FIG. 10. The graph shown in FIG. 10 represents a relationship between the second upper limit pressure $P_{S2}$ and the assumed speed $V_{TO}$ of the automobile. It should be noted that the second upper limit pressure $P_S$ is decreased when the speed of the automobile is low since torque generated by the engine is high when the speed of the automobile is low. If a large braking force is applied in such a state, a differential gear may be damaged. Additionally, the second upper limit pressure $P_S$ is decreased also when the speed of the automobile is high. This is because rubber parts in the brake system may be damaged due to a sharp increase in temperature of the brake pad if a large braking force is applied when the speed of the automobile is high. In S48, an upper limit pressure $P_{Sb}$ is obtained by selecting a smaller value of the first upper limit pressure $P_S$ and the second upper limit pressure $P_{S2}$. After the upper limit pressure $P_{Sb}$ is obtained, a pressure difference dP between the upper limit pressure $P_{Sb}$ and a greater one of the pressure $P_B$ in the wheel cylinders 9 and 10 is obtained in S50.

In S52, a first output pattern for the brake controlling operation is set by comparing the pressure difference dP with predetermined values a and b, where a>b and, for example, a=15 kg/cm$^2$ and b=5 kg/cm$^2$. For example, the output pattern for the brake controlling operation is determined as: a sharp increase FU if dP<−a; a gentle increase SU if −a≦dP<−b; a gentle decrease SD if −b≦dP<b; a sharp decrease FD if a≦dP. Thereafter, in S54, a second output pattern for the brake controlling operation is set by referring to the two-dimensional map shown in FIG. 8. The second output pattern is obtained by using an acceleration $dV_W$ which is a value of differential calculus of the speed $V_W$ of the driving wheel, and a speed difference ($V_W - V_{TO}$) between the speed $V_W$ of the driving wheel and the assumed speed $V_{TO}$ of the automobile. In S56, a smaller one of the first output pattern and the second output pattern is selected.

Figure 11:
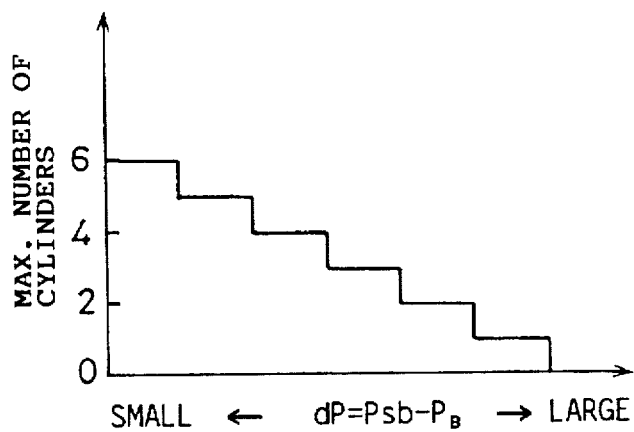
FIG. 11 is a graph representing the maximum number of cylinders to which a fuel cutting operation is applied.
Figure 12:
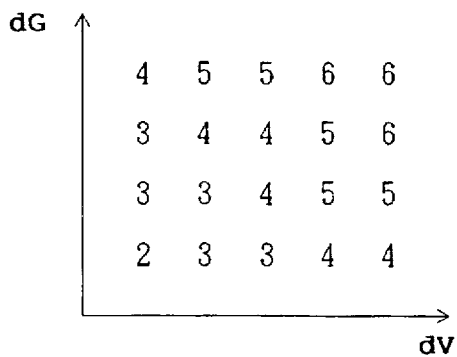
FIG. 12 is a map representing the maximum number of cylinders to which the fuel cutting operation is applied.

In S58, a first maximum number of cylinders to which a fuel cut-off operation is applied is obtained by using the pressure difference dP obtained in S50 and by referring to a graph shown in FIG. 11. It should be noted that the engine of the present embodiment is assumed to have six cylinders. The graph shown in FIG. 11 represents that the number of cylinders to which the fuel cut-off operation is applied is increased as the pressure difference dP decreases, that is, a margin of the pressure to be applied to the wheel cylinder deceases. In S60, a second maximum number of cylinders to which a fuel cut-off operation is applied is obtained by using a speed difference dV and an acceleration difference dG, and by referring to a map shown in FIG. 12. The speed difference dV is a difference between the speed $V_W$ and the assumed speed $V_{TO}$ of the automobile ($dV=V_W-V_{TO}$). The acceleration difference dG is a difference between an acceleration $dV_W$ of the driving wheel and an acceleration $dV_{TO}$ of the automobile ($dG=dV_W-dV_{TO}$). The map shown in FIG. 12 represents that the number of cylinders to which the fuel cut-off operation is applied is increased as the speed difference dV increases or the acceleration difference dG increases.

In S62, a greater one of the first maximum 20 number of cylinders and the second maximum number of cylinders is selected. In S64, the second and third solenoid valves 21 and 22 are driven in accordance with the output pattern selected in S54. Additionally, in S64, the fuel cut-off operation is performed for the number of cylinders selected in S62.

Thereafter, it is determined, in S66, whether or not an end condition for ending the brake controlling operation is established. The end condition includes conditions such as: the rotational speed of the driving wheel is less than the predetermined target speed; the automobile is not allowed to perform the brake controlling operation; and, a speed of the automobile is greater than a predetermined speed, for example, 300 km/h. If the ending condition has not been established, the routine returns to S40 to repeat the above-mentioned steps. If it is determined that the ending condition is established, the brake controlling operation executing flag is reset, in S68, to end the brake controlling operation, and then the routine is ended.

Figure 13:
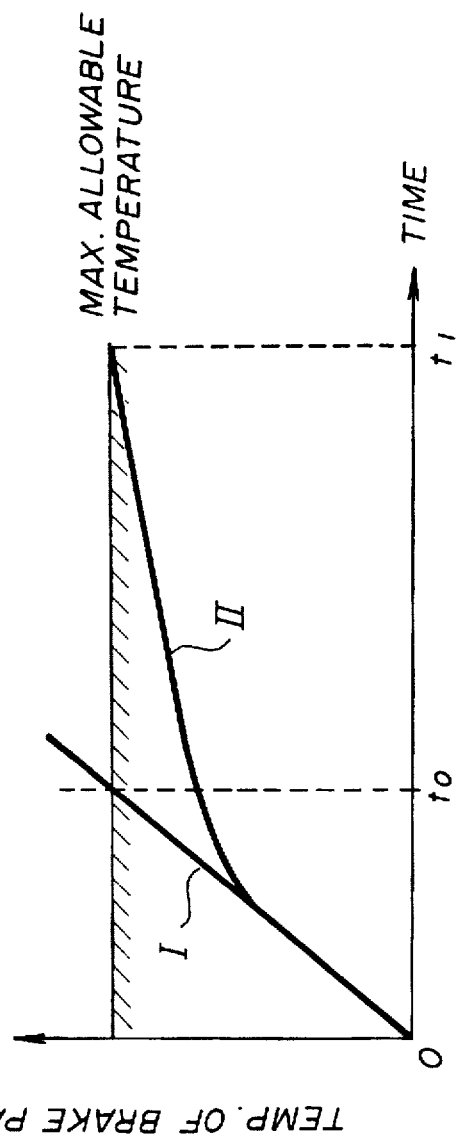
FIG. 13 is a graph for explaining an increasing characteristic of a brake pad temperature.

As indicated by a solid line I in FIG. 13, if only the brake controlling operation is performed to control the acceleration slip of the driving wheel, the temperature of the brake pad increases linearly to the maximum allowable temperature. The temperature of the brake pad reaches the maximum allowable temperature at a time $t_0$. The brake controlling operation is inhibited after the time $t_0$. On the other hand, as indicated by a solid line II in FIG. 13, the time the temperature of the brake pad reaches the maximum allowable temperature is greatly extended to a time $t_1$ when the fuel cut-off operation is performed in addition to the brake controlling operation. Thus, the time period during which the brake controlling operation can be performed is greatly extended.

A description will now be given, with reference to FIG. 14, of another process for assuming the temperature of the brake pad.

Figure 14:
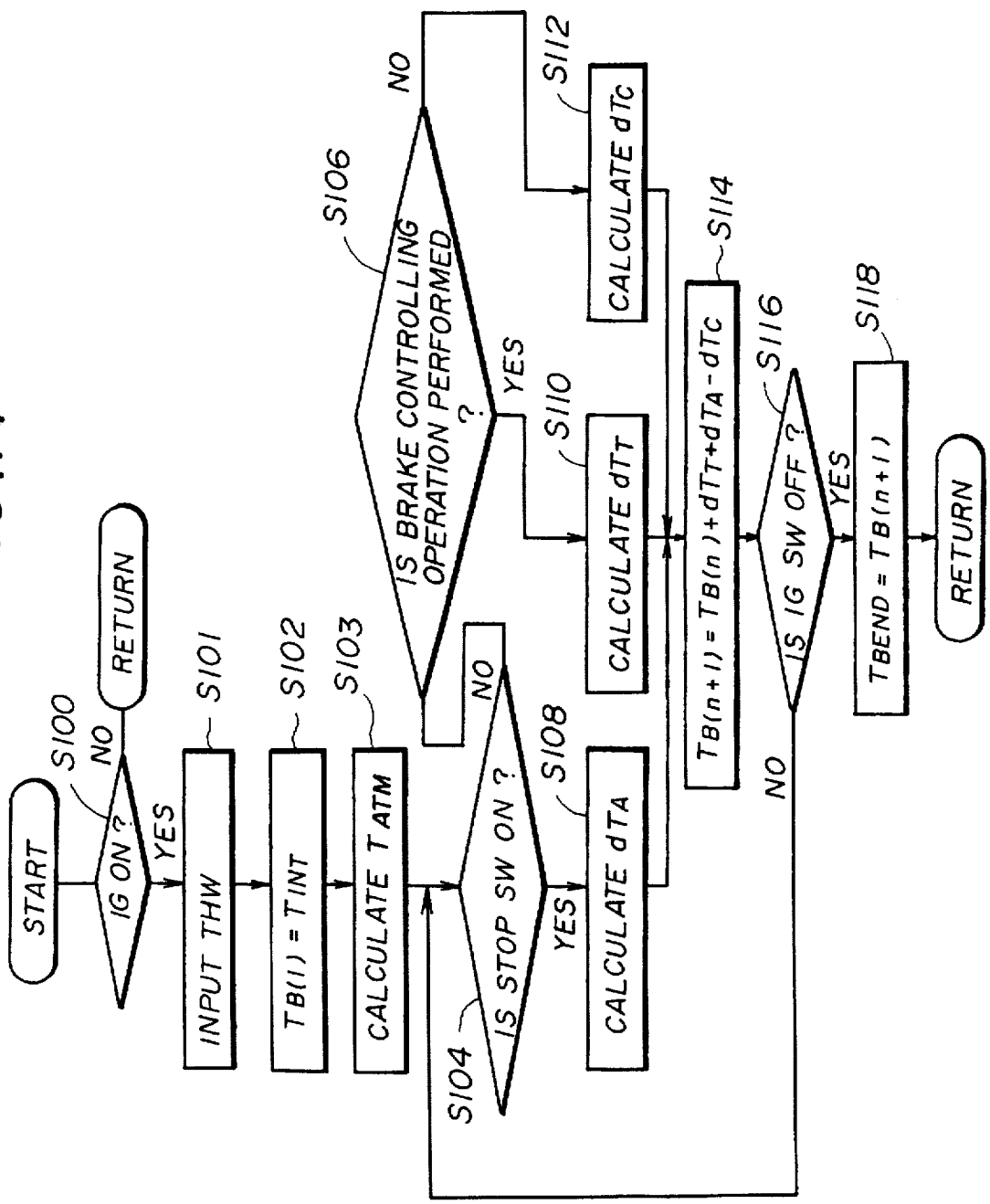
FIG. 14 is a flowchart of another process for assuming the temperature of the brake pad.

In FIG. 14, it is determined, in S100, whether or not an ignition switch is turned on. If the ignition switch is off, the routine is ended. If the ignition switch is turned on, the routine proceeds to S101 to start an assuming operation for the temperature of the brake pad. In S101, the temperature of the engine coolant is read. In S102, an initial temperature $T_{INT}$ of the brake pad is calculated by the following equation.

$$T_{INT}=\text{MIN}[\text{THW}, T_{BEND}] \quad (6)$$

Where, THW is a temperature of the coolant read in S101; $T_{BEND}$ is a temperature of the brake pad assumed when the ignition switch was turned off at a previous time. The operator MIN represents that a smaller value of the two terms THW and $T_{BEND}$ is selected. The initial temperature $T_{INT}$ is set as a temperature $T_{B(1)}$ of the brake pad.

In S103, a temperature $T_{ATM}$ of atmosphere of the brake pad is calculated by the following equation.

$$T_{ATM}=\text{MIN}[\text{THW}, 0°\text{ C.}] \quad (7)$$

That is, a smaller value of the temperature THW of the coolant and the temperature of 0° C. is selected.

Thereafter, it is determined, in S104, whether or not the pedal switch 44 is turned on. If it is determined that the pedal switch 44 is not turned on, the routine proceeds to S106. It is then determined, in S106, whether or not the brake controlling operation for controlling the slippage of the driving wheels is performed. The determination is made based on whether a brake control execution flag is set or reset.

If it is determined, in S104, that the pedal switch 44 is turned on, the routine proceeds to S108 in which a temperature increase $dT_A$ of the brake pad of each of the rear left and right wheels (driving wheels) 7 and 8 due to a normal braking operation is calculated by the above-mentioned equation (1).

If it is determined, in S106, that the brake controlling operation is being performed, the routine proceeds to S110 in which a temperature increase $dT_T$ of the brake pad of each of the rear left and right wheels (driving wheels) 7 and 8 due to the brake controlling operation is calculated by the above-mentioned equations (2) and (3).

On the other hand, if it is determined, in S106, that the braking operation is not being performed, the routine proceeds to S112 in which a temperature decrease $dT_C$ of the brake pad of each of the rear left and right wheels (driving wheels) 7 and 8 is calculated by the following equation (8).

$$dT_C=k1(T_{B(n)}-T_{ATM}) \quad (8)$$

After the above-mentioned steps S108, S110 or S112 is processed, the routine proceeds to S114 in which a temperature $T_B$ of the brake pad of each of the driving wheels 7 and 8 is calculated by the above-mentioned equation (5).

Thereafter, it is determined, in S116, whether or not the ignition switch is turned on. If the ignition switch is turned on, the routine returns to S104 to repeat the above-mentioned steps. If the ignition switch is off, the routine proceeds to S118 in which the temperature $T_{B(n+1)}$ is set as the temperature $T_{BEND}$, and then the routine is ended. It should be noted that the temperature $T_{BEND}$ is stored in the backup RAM 40d.

In the process shown in FIG. 4, the ambient temperature or a predetermined temperature such as 0° C. is used as the initial temperature $T_{INT}$ of the brake pad. If a long period of time exists during which the ignition switch is turned off, the temperature of the brake pad returns to the temperature of the atmosphere and, thus, there is no considerable difference between an actual temperature and the assumed temperature of the brake pad.

However, if the ignition switch is turned on when the temperature of the brake pad is greater than the ambient temperature or the predetermined temperature of 0° C., the initial temperature is set below an actual temperature of the brake pad. This condition happens, for example, when the ignition switch is turned on a short period of time after the ignition switch was turned off when the temperature of the brake pad is still high. In such a case, the temperature of the brake pad is calculated to be lower than the actual temperature. This results in a condition as if the maximum allowable temperature of the brake pad is raised. Thus, there may be a problem in that the brake pad is excessively heated by an undesired continuous braking operation for controlling the acceleration slip, resulting in brake fade or premature wearing of the brake pad.

In order to avoid the above-mentioned problem, it is proposed to set the predetermined temperature for the initial temperature of the brake pad at a higher level. However, if the temperature of the brake pad is assumed to be considerably higher than an actual temperature, this results in a condition as if the maximum allowable temperature of the brake pad is less. Thus, there may be a problem in that the brake controlling operation is frequently inhibited, resulting in insufficient control of the acceleration slip.

It should be noted that the temperature of the coolant is normally about 90° C. and the temperature of the brake pad is normally about 20° C. to about 100° C. immediately after the ignition switch is turned off when driving is stopped. The temperatures of the coolant and the brake pad gradually decreases with passage of time. In the process shown in FIG. 14, the initial temperature of the brake pad is set to the smaller value of the temperature of the coolant when the ignition switch is turned on and the temperature of the brake pad assumed when the ignition switch is turned off at a previous time. Therefore, according to the process shown in FIG. 14, the initial temperature $T_{INT}$ can be close to an actual temperature of the brake pad, and thus the above-mentioned problems can be eliminated.

Additionally, the temperature of the coolant when the ignition switch is turned on or the predetermined temperature of 0° C. is used as the temperature $T_{ATM}$ of the atmosphere of the brake pad when the temperature decrease $dT_C$ is calculated. Accordingly, the temperature decrease $dT_C$ can be close to an actual temperature of the brake pad and, thus, the temperature of the brake pad can be assumed accurately.

The present invention is not limited to the specifically disclosed embodiments, and variations and modifications may be made without departing from the scope of the present invention.

What is claimed is:

1. A temperature assuming apparatus which assumes a temperature of a brake pad provided in a driving wheel of an automobile so as to reduce acceleration slip of the driving wheel during acceleration, said temperature assuming apparatus comprising:

a first temperature increase calculating means for calculating a first increase in temperature of the brake pad due to a normal braking operation, the first increase in temperature being in response to braking deceleration;

a second temperature increase calculating means for calculating a second increase in temperature of the brake pad due to a braking operation to control the acceleration slip of the driving wheel, the second increase in temperature being in response to a braking force and a rotational speed of the driving wheel;

temperature decrease calculating means for calculating a decrease in temperature of the brake pad when a braking operation is not performed, the decrease in temperature being in response to a rotational speed of the driving wheel; and temperature assuming means for assuming a temperature of the brake pad in accordance with said first increase, said second increase and said decrease in temperature of the brake pad;

wherein said temperature assuming means comprises initial temperature assuming means for assuming an initial temperature of the brake pad based on a temperature of engine coolant of the automobile.

2. The temperature assuming apparatus as claimed in claim 1, wherein said initial temperature assuming means assumes said initial temperature by selecting one of a temperature of the brake pad previously assumed and the temperature of the engine coolant.

3. The temperature assuming apparatus as claimed in claim 1, further comprising ambient temperature assuming means for assuming a atmospheric temperature of the brake pad by selecting one of the temperature of the engine coolant and a predetermined temperature.

4. The temperature assuming apparatus as claimed in claim 3, wherein said predetermined temperature is 0° C.

5. An acceleration slip controlling apparatus comprising:

a temperature assuming apparatus which assumes a temperature of a brake pad provided in a driving wheel of an automobile so as to reduce acceleration slip of the driving wheel during acceleration, said temperature assuming apparatus comprising: a first temperature increase calculating means for calculating a first increase in temperature of the brake pad due to a normal braking operation, the first increase in temperature being in response to braking deceleration; a second temperature increase calculating means for calculating a second increase in temperature of the brake pad due to a braking operation to control the acceleration slip of the driving wheel, the second increase in temperature being in response to a braking force and a rotational speed of the driving wheel; temperature decrease calculating means for calculating a decrease in temperature of the brake pad when a braking operation is not performed, the decrease in temperature being in response to a rotational speed of the driving wheel; and, temperature assuming means for assuming a temperature of the brake pad in accordance with said first increase, said second increase and said decrease in temperature of the brake pad; and brake controlling means for controlling a braking operation of the driving wheel to reduce the acceleration slip in accordance with a temperature of the brake pad assumed by said temperature assuming apparatus, wherein said brake controlling means controls the braking operation by varying a pressure supplied to a wheel cylinder of a driving wheel, the pressure being limited to less than a predetermined pressure.

6. The acceleration slip controlling apparatus as claimed in claim 5, wherein said predetermined pressure is determined by a relationship between the temperature of the brake pad assumed by said temperature assuming means and an allowable pressure supplied to said wheel cylinder.

7. The acceleration slip controlling apparatus as claimed in claim 5, wherein said predetermined pressure is determined by selecting one of a first predetermined pressure and a second predetermined pressure, said first predetermined pressure based on a relationship between the temperature of the brake pad assumed by said temperature assuming means and an allowable pressure supplied to said wheel cylinder, said second predetermined pressure based on a relationship between a speed of the automobile and an allowable pressure supplied to said wheel cylinder.

8. The acceleration slip controlling apparatus as claimed in claim 5, wherein variation of said pressure supplied to said wheel cylinder is defined by a predetermined output pattern.

9. The acceleration slip controlling apparatus as claimed in claim 8, wherein said predetermined output pattern is selected from a first output pattern and a second output pattern, said first output pattern obtained from a pressure difference between a pressure in said wheel cylinder and said predetermined pressure, said second output pattern obtained from an acceleration of the driving wheel and a speed difference between the speed of the driving wheel and a speed the automobile.

10. The acceleration slip controlling apparatus as claimed in claim 5, further comprising:

engine controlling means for controlling the acceleration slip of the driving wheel by controlling an output of an engine of the automobile; and distributing means for distributing load for controlling the acceleration slip of the driving wheel to said brake controlling means and said engine controlling means.

11. The acceleration slip controlling apparatus as claimed in claim 10, wherein said engine controlling means controls the acceleration slip by applying a fuel cut-off operation to a predetermined number of cylinders of the engine.

12. The acceleration slip controlling apparatus as claimed in claim 11, wherein said predetermined number of cylinders is selected from a first number of cylinders and a second number of cylinders, said first number of cylinders obtained from a relationship between a pressure difference between a pressure in said wheel cylinder and a predetermined pressure supplied to the wheel cylinder to control the acceleration slip and a maximum number of cylinders to which a fuel cut-off operation is performed, said second number of cylinders obtained from a relationship among a maximum number of cylinders to which said fuel cut-off operation is applied, a speed difference and an acceleration difference, the speed difference being a difference between a rotational speed of the driving wheel and a speed of the automobile, the acceleration difference being a difference between an acceleration of the driving wheel and an acceleration of the automobile.

* * * * *